(12) United States Patent
Schäfer et al.

(10) Patent No.: US 6,943,265 B2
(45) Date of Patent: Sep. 13, 2005

(54) METHOD FOR THE PRODUCTION OF HYDROXYALKYL POLYSILOXANES

(75) Inventors: Oliver Schäfer, München (DE); Thomas Kammel, München (DE); Bernd Pachaly, Mehring/Öd (DE)

(73) Assignee: Consortium fur Elektrochemische Industrie, GmbH, Munich (DE)

( * ) Notice: Subject to any disclaimer, the term of this patent is extended or adjusted under 35 U.S.C. 154(b) by 195 days.

(21) Appl. No.: 10/469,663

(22) PCT Filed: Feb. 7, 2002

(86) PCT No.: PCT/EP02/01287

§ 371 (c)(1),
(2), (4) Date: Sep. 2, 2003

(87) PCT Pub. No.: WO02/070586

PCT Pub. Date: Sep. 12, 2002

(65) Prior Publication Data

US 2004/0073031 A1 Apr. 15, 2004

(30) Foreign Application Priority Data

Mar. 1, 2001 (DE) .......................... 101 09 842

(51) Int. Cl.$^7$ .................................................. C07F 7/04
(52) U.S. Cl. ........................ 556/443; 556/467; 528/22; 534/726
(58) Field of Search ................. 556/443, 467; 528/22; 534/726

(56) References Cited

FOREIGN PATENT DOCUMENTS

EP  0 629 648 A2  12/1994

*Primary Examiner*—Samuel Barts
(74) *Attorney, Agent, or Firm*—Brooks Kushman P.C.

(57) ABSTRACT

The invention relates to a method for the production of hydroxyalkyl polysiloxanes of general formula (V) $(SiO_{4/2})_k(R^1{}_2SiO_{3/2})_m(R^1{}_2SiO_{2/2})_p(R^1{}_3SiO_{1/2})_q[O_{1/2}SiR^3{}_2-(CR^4{}_2)_b-OH]_s[O_{1/2}H]_t$ (V), wherein organosiloxanes of general formula (VI) $(SiO_{4/2})_k(R^1SiO_{3/2})_m(R^1{}_2SiO_{2/2})_p(R^1{}_3SiO_{1/2})_q[O_{1/2}H]_r$(VI) containing silanol are made to react with compounds having at least one unit of general formula (IV) $[O-(CR^4{}_2)_b-SiR^3{}_2]_n-$(IV).

9 Claims, No Drawings

METHOD FOR THE PRODUCTION OF HYDROXYALKYL POLYSILOXANES

BACKGROUND OF THE INVENTION

1. Field of the Invention

The present invention relates to a process for preparing hydroxyalkylpolysiloxanes.

2. Description of the Related Art

Hydroxyalkylpolysiloxanes and hydroxyalkylsilicone resins are used in many applications, e.g. in the cosmetics and textile industries. However, the commercial use of these compounds on an even greater scale is prevented by a relatively cumbersome production process. A known method is direct hydrosilylation of protected or unprotected alkenols, e.g. allyl alcohol or hexenyl alcohol, with alpha, omega-H-siloxanes. Disadvantages of these processes are either the use of relatively expensive starting materials, e.g. platinum catalysts or hexenyl alcohol, or the secondary reaction of hydrogen elimination which occurs in the reaction catalyzed by noble metals and leads to hydrolytically unstable alkenyloxy end groups which can easily be cleaved hydrolytically with elimination of alkenols. To avoid this secondary reaction, the alcohols used can be protected, but the protective group has to be removed in a further process step, which is costly.

EP-A-629648 describes a further process which starts out from specific cyclic silanes of the formula I which can react with HO—Si groups (silanol groups) at the end of a silicone chain without the use of catalysts.

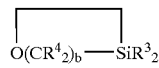  (I)

In this formula, $R^3$ is a hydrocarbon radical having up to 20 carbon atoms, $R^4$ is hydrogen or a hydrocarbon radical having up to 20 carbon atoms. These cyclic compounds can be reacted with silanol-terminated siloxanes of the formula II $$HO(R^1{}_2SiO)_pH \quad (II)$$

to give carbinol-terminated siloxanes of the formula III.

  (III)

It is emphasized that the reaction without the use of catalysts is carried out at temperatures of from 25° C. to 150° C.

However, some problems are found in carrying out this reaction in practice. Although the 6-membered ring with b=4 can be obtained in stable form, it requires an elevated reaction temperature and quite prolonged reaction times in the reaction with silanol end groups. The 5-membered rings which are reactive for the purposes of EP-A-629648 can be used in principle, but they are unstable substances and tend to decompose. The process described in EP-A-629648 is thus not very suitable for industrial implementation.

It is therefore an object of the present invention to develop an improved process for preparing hydroxyalkylpolysiloxanes.

DETAILED DESCRIPTION OF THE PREFERRED EMBODIMENT

The invention accordingly provides a process for preparing hydroxyalkylpolysiloxanes of the formula V

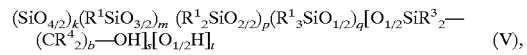  (V), in which silanol-containing organosiloxanes of the formula VI

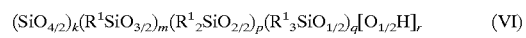  (VI)

are reacted with compounds comprising at least one unit of the formula IV

  (IV)

where
$R^1$, $R^3$, $R^4$ are each a hydrogen atom or a monovalent $C_1$–$C_{20}$-hydrocarbon radical or $C_1$–$C_{15}$-hydrocarbonoxy radical which may be unsubstituted or substituted by —CN, —NCO, —NR$^x{}_2$, —COOH, —COOR$^x$, halogen, acryl, epoxy, —SH, —OH or —CONR$^x{}_2$, in which one or more nonadjacent methylene units may be replaced by —O—, —CO—, —COO—, —OCO—, or —OCOO—, —S— or —NR$^x$— groups and in which one or more nonadjacent methine units may be replaced by —N=, —N=N— or —P= groups,
$R^x$ is hydrogen or a $C_1$–$C_{10}$-hydrocarbon radical which may be unsubstituted or substituted by —CN or halogen,
b is at least 2,
s is at least 1,
r is at least 1,
n is at least 2,
s+t=r and
k+m+p+q is at least 2.

The invention is based on the recognition that linear siloxanes are also suitable for functionalizing Si—OH groups. If compounds comprising units of the formula IV are used, these react readily and specifically with silanol end groups to give carbinols in good yields.

Compounds comprising units of the formula IV are stable and can be stored, and are therefore particularly well suited to use on an industrial scale.

The $C_1$–$C_{20}$-hydrocarbon radicals and $C_1$–$C_{20}$-hydrocarbonoxy radicals $R^1$, $R^3$, $R^4$ may be aliphatically saturated or unsaturated, aromatic, linear or branched. $R^1$, $R^3$, $R^4$ preferably have from 1 to 12 atoms, in particular from 1 to 6 atoms, preferably only carbon atoms or one alkoxy oxygen atom and otherwise only carbon atoms. $R^1$, $R^3$, $R^4$ are preferably linear or branched $C_1$–$C_6$-alkyl radicals. Particular preference is given to the radicals methyl, ethyl, phenyl, vinyl and trifluoropropyl.

Preference is given to preparing compounds of the formula V in which $R^3$ is a methyl radical and $R^4$ is hydrogen. b is preferably not more than 50, in particular not more than 10. In a particularly preferred embodiment, b is 3.

The hydroxy-functional organosiloxane of the formula VI may be linear, cyclic or branched. The sum of k, m, p, q, s and t is preferably in the range from 2 to 20 000, in particular from 8 to 1000. To make a reaction between the organosiloxane comprising units of the formula VI and the linear siloxane possible, the organosiloxane of the formula VI has to contain hydroxy groups.

A preferred variant of an organosiloxane of the formula VI is a linear silicone polymer in which k and m are each 0, p is greater than or equal to 1, q is 0 or 1 and r is 1 or 2, with the proviso that q=2−r. r is preferably equal to s. The preferred siloxanes of the formula VI can have either a monomodal or multimodal distribution and can at the same time have a narrow or very broad distribution.

A further preferred variant of a branched organosiloxane of the formula VI which can be used is an organosilicone resins. This can be made up of a plurality of units, as indicated in the formula VI, with the molar percentages of the units present being indicated by the indices k, m, p, q, r, s and t. Preference is given to from 0.1 to 20 mol % of units r, based on the sum of k, m, p, q and r. At the same time, however, k+m has to be >0. In the preparation of the organosiloxane resin of the formula V, s has to be >0 and s+t has to be equal to r. Preference is given to preparing resins in which 5%<k+m<90%, based on the sum of k, m, p, q, s and t, and t is preferably equal to 0. In a particularly preferred case, the radical $R^3$ is a methyl radical, $R^1$ is a methyl radical and d is 3 and $R^4$ is hydrogen.

As compounds comprising at least one unit of the formula IV, preference is given to using compounds of the formula VII

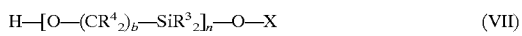

H—[O—(CR$^4_2$)$_b$—SiR$^3_2$]$_n$—O—X  (VII)

where
X is hydrogen or a $C_1$–$C_{10}$-hydrocarbon radical which may be unsubstituted or substituted by —CN or halogen and $R^3$, $R^4$, b and n are as defined above.

X is preferably hydrogen or a $C_1$–$C_3$-hydrocarbon radical, in particular a methyl or ethyl radical.

Compounds of the formula VII in which X is hydrogen can dimerize. However, the dimers react in the same way as the monomers with organosiloxanes of the formula VI.

As halogen substituents in the above formulae, preference is given to fluorine, chlorine and bromine.

The process can be carried out in the absence of catalysts, preferably at temperatures of from 0° C. to 150° C., preferably at least 100° C. However, the process can be improved further by adding particular catalysts. These catalysts are acidic or basic compounds and enable both the reaction times and the reaction temperatures to be reduced.

The catalyst used is an inorganic or organic Lewis acid or Lewis base, and organic Brönsted acid or base, an organometallic compound or a halide salt.

Preferred acids are carboxylic acids, partly esterified carboxylic acids, in particular monocarboxylic acids, preferably formic acid or acetic acid, or unesterified or partly esterified monophosphoric, oligophosphoric or polyphosphoric acids.

Preferred bases are alkylammonium hydroxides, ammonium alkoxides, alkylammonium fluorides or amine bases. Preferred organometallic reagents are organotin compounds, organozinc compounds or organotitanium compounds. Preferred salts are tetraalkylammonium fluorides.

Preference is given to phosphoric acids of the formula VIII

O=P(OR$^2$)$_{3-v}$(OH)$_v$  (VIII)

where
$R^2$ is a substituted or unsubstituted, linear or branched $C_1$–$C_{30}$-alkyl, $C_2$–$C_{40}$-alkenyl or —alkoxyalkyl, $C_2$–$C_{40}$-polyether, $C_5$–$C_{14}$-cycloalkyl or -aryl radical and
v is 0, 1 or 2.

After the functionalization reaction of the silanol groups, the catalysts used are preferably deactivated by addition of anticatalysts or catalyst poisons before they can lead to cleavage of the Si—O—Si groups. This secondary reaction is dependent on the catalyst used and does not necessarily occur, so that deactivation may also be able to be omitted. Examples of catalyst poisons are, for example, acids when bases are used and bases when acids are used, so that the ultimate effect is a simple neutralization reaction. The reaction product of catalyst and catalyst poison can, depending on the use of the process product, either be removed from the process product or remain in the process product.

In the process for preparing hydroxyalkylpolysiloxanes of the formula V, the amount of the compound containing units of the formula IV which is used depends on the amount r of the silanol groups to be functionalized in the organosiloxane of the formula VI. However, if complete functionalization of the OH groups is to be achieved, the compound containing units of the formula IV is added in at least equimolar amounts, based on n. If the compound containing units of the formula IV is used in excess, unreacted compound can subsequently either be thermolytically decomposed and then distilled off or hydrolysed and then, if appropriate, likewise distilled off.

If resins which have a defined carbinol content s+t are to be prepared, the stoichiometric ratios of resin to compound containing units of the formula IV are chosen so that the desired carbinol content is achieved. Remaining unreacted Si—OH groups can remain in the organofunctional siloxane of the formula V or are, before or after the reaction with the compound containing units of the formula IV, reacted with, for example, silazanes of the formula IX

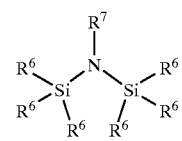

(IX)

where
$R^6$ is hydrogen or a $C_1$–$C_{10}$-hydrocarbon radical which may be unsubstituted or substituted by —CN or halogen and $R^7$ is a $C_1$–$C_{10}$-hydrocarbon radical which may be unsubstituted or substituted by —CN or halogen.

The hydrocarbon radical $R^6$ and $R^7$ preferably have from 1 to 5 carbon atoms. Particular preference is given to the radicals methyl, ethyl and vinyl. $R^7$ is preferably hydrogen.

The process is preferably carried out at from 0° C. to 160° C., particularly preferably from 40° C. to 100° C. The process can be carried out either in the presence of solvents or else without the use of solvents in suitable reactors. It may be carried out under reduced pressure or under superatmospheric pressure or at atmospheric pressure (0.1 MPa).

When solvents are used, preference is given to inert, in particular aprotic solvents such as aliphatic hydrocarbons, e.g. heptane or decane, and aromatic hydrocarbons, e.g. toluene or xylene. Ethers such as THF, diethyl ether or MTBE can likewise be used. The amount of solvent should be sufficient to ensure sufficient homogenization of the reaction mixture. Solvents or solvent mixtures having a boiling point or boiling range up to 120° C. at 0.1 MPa are preferred.

The meanings of all the symbols used in the above formulae are independent of one another.

In the following examples, unless indicated otherwise, all amounts and percentages are by weight, all pressures are 0.10 MPa (abs.) and all temperatures are 20° C. All viscosities were determined at 25° C.

EXAMPLE 1

1000 g of Me-siloxane (bishydroxy-terminated polydimethylsiloxane having an $M_n$ of 3000 g/mol, determined by $^1$H-NMR spectroscopy) were reacted at 80° C. with 79.4 g of poly(1,1-dimethyl-1-sila-2-oxacyclopentane) having a viscosity of 40 mPas and 100 mg of formic acid. $^1$H-NMR and $^{29}$Si-NMR spectra showed that after 4 hours all OH groups had been converted into hydroxypropyl units. 500 mg of triethylamine were subsequently added to the reaction solution to deactivate the catalyst and the mixture was distilled briefly at 80° C. under reduced pressure (5 mbar). This left pure bishydroxypropylpolydimethylsiloxane.

EXAMPLE 2

1000 g of Me-siloxane (bishydroxy-terminated polydimethylsiloxane having an $M_n$ of 3000 g/mol, determined by $^1$H-NMR spectroscopy) were reacted at 80° C. with 77.6 g of poly(1,1-dimethyl-1-sila-2-oxacyclopentane) having a viscosity of 40 mPas and 100 mg of formic acid. $^1$H-NMR and $^{29}$Si-NMR spectra showed that after 4 hours no Si—OH groups and no poly(1,1-dimethyl-1-sila2-oxacyclopentane) were present. This gave 97% of the desired product bishydroxypropylpolydimethylsiloxane and 3% of a partially esterified formic acid-propylhydroxypropyl-polydimethylsiloxane.

EXAMPLE 3

1000 g of siloxane (bishydroxy-terminated polydimethylsiloxane having an $M_n$ of 28 000 g/mol, determined by measurement of the OH number) were reacted at 80° C. with 8.4 g of poly(1,1-dimethyl-1-sila-2-oxacyclopentane) having a viscosity of 40 mPas and 100 mg of Arlypon® (partly esterified phosphoric acid from Grünau, Illertissen). $^1$H-NMR and 29Si-NMR spectra showed that after 3 hours all OH groups had been converted into hydroxypropyl units. 500 mg of triethylamine were subsequently added to the reaction solution to deactivate the catalyst and the mixture was distilled briefly at 80° C. under reduced pressure (5 mbar). This left pure bishydroxypropylpolydimethylsiloxane.

EXAMPLE 4

100 g of Me-siloxane (bishydroxy-terminated polydimethylsiloxane having an $M_n$ of 1000 g/mol, determined by $^1$H-NMR spectroscopy) were reacted at 80° C. with 23.4 g of poly(1,1-dimethyl-1-sila-2oxacyclopentane) having a viscosity of 40 mPas and 10 mg of Arlypon®. $^1$H-NMR and $^{29}$Si-NMR spectra showed that after 4 hours all OH groups had been converted into hydroxypropyl units. 500 mg of triethylamine were subsequently added to the reaction solution to deactivate the catalyst and the mixture was distilled briefly at 80° C. under reduced pressure (5 mbar). This left pure bishydroxypropylpolydimethylsiloxane.

EXAMPLE 5

1000 g of silicone oil (bishydroxy-terminated polydimethylsiloxane having a vinyl:methyl ratio of 1:4 and an $M_n$ of 2800 g/mol, determined by 1H-NMR spectroscopy) were reacted at 80° C. with 83.2 g of poly(1,1-dimethyl-1-sila-2-oxacyclopentane) having a viscosity of 60 mPas and 100 mg of formic acid. $^1$H-NMR and $^{29}$Si-NMR spectra showed that after 3 hours all OH groups had been converted into hydroxypropyl units. 500 mg of triethylamine were subsequently added to the reaction solution to deactivate the catalyst and the mixture was distilled briefly at 80° C. under reduced pressure (5 mbar). This left pure bishydroxypropylpolydimethylsiloxane.

EXAMPLE 6

100 g of silicone oil (bishydroxy-terminated polydimethylsiloxane having a trifluoropropyl:methyl ratio of 1:1 and an $M_n$ of 900 g/mol, determined by $^1$H-NMR spectroscopy) were reacted at 80° C. with 26.0 g of poly(1,1-dimethyl-1-sila-2-oxacyclopentane) having a viscosity of 60 mPas and 10 mg of formic acid. $^1$H-NMR and $^{29}$Si-NMR spectra showed that after 3 hours all OH groups had been converted into hydroxypropyl units. 500 mg of triethylamine were subsequently added to the reaction solution to deactivate the catalyst and the mixture was distilled briefly at 80° C. under reduced pressure (5 mbar). This left pure bishydroxypropylpolydimethylsiloxane.

EXAMPLE 7

100 g of monohydroxy-terminated polydimethylsiloxane having an $M_n$ of 3000 g/mol, determined by $^1$H-NMR spectroscopy, were reacted at 80° C. with 3.9 g of poly(1,1-dimethyl-1-sila-2-oxacyclopentane) having a viscosity of 110 mPas and 10 mg of Arlypon® (partly esterified phosphoric acid from Grünau, Illertissen). $^1$H-NMR and $^{29}$Si-NMR spectra showed that after 3 hours all OH groups had been converted into hydroxypropyl units and no broadening of the molecular weight distribution was discernible. 500 mg of triethylamine were subsequently added to the reaction solution to deactivate the catalyst and the mixture was distilled briefly at 80° C. under reduced pressure (5 mbar). This left pure monohydroxypropylpolydimethylsiloxane.

EXAMPLE 8

100 g of monohydroxy-terminated polydimethylsiloxane having an $M_n$ of 3000 g/mol, determined by $^1$H-NMR spectroscopy, were reacted at 80° C. with 3.9 g of poly(1,1-dimethyl-1-sila-2-oxacyclopentane) having a viscosity of 110 mPas and 50 mg of benzyltrimethylammonium hydroxide (40% strength solution in methanol). $^1$H-NMR and $^{29}$Si-NMR spectra showed that after 4 hours all OH groups had been converted into hydroxypropyl units and no broadening of the molecular weight distribution was discernible. 500 mg of triethylamine were subsequently added to the reaction solution to deactivate the catalyst and the mixture was distilled briefly at 80° C. under reduced pressure (5 mbar). This left pure monohydroxypropylpolydimethylsiloxane.

What is claimed is:

1. A process for preparing hydroxyalkylpolysiloxanes of the formula V

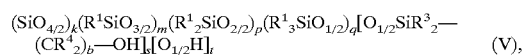

(V), in which silanol-containing organosiloxanes of the formula VI

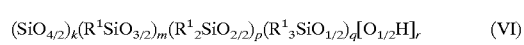

(VI)

are reacted with compounds comprising at least one unit of the formula IV

(IV)

where $R^1$, $R^3$, $R^4$ are each a hydrogen atom or a monovalent $C_1$–$C_{20}$-hydrocarbon radical or $C_1$–$C_{15}$- hydrocarbonoxy radical which may be unsubstituted or substituted by —CN, —NCO, —NR$^x_2$, —COOH, —COOR$^x$, halogen, acryl, epoxy, —SH, —OH or —CONR$^x_2$, in which one or more nonadjacent methylene units may be replaced by —O—, —CO—, —COO—, —OCO—, or —OCOO—, —S— or —Nr$^x$— groups and in which one or more nonadjacent methine units may be replaced by —N=, —N=N— or —P= groups, R$^x$ is hydrogen or a $C_1$–$C_{10}$-hydrocarbon radical which may be unsubstituted or substituted by —CN or halogen, b is at least 2, s is at least 1, r is at least 1, n is at least 2, s+t=r and k+m+p+q is at least 2.

2. The process as claimed in claim 1, in which $R_1$ is methyl, ethyl, phenyl, vinyl or triflouropropyl.

3. The process as claimed in claim 2, in which $R^4$ is hydrogen.

4. The process as claimed in claim 3, in which $R^3$ is a methyl radical.

5. The process as claimed in claim 1, in which a linear organosiloxane of the formula VI in which k and m are each 0, p is greater or equal to 1, q is 0 or 1 and r is 1 or 2 is used.

6. The process as claimed in claim 1, in which results in which 5%<k+m<90%, based on the sum of k, m, p, q, s and t, are prepared.

7. The process as claimed in claim 1, in which the reaction temperature is from 0° C. to 160° C.

8. The process as claimed in claim 7, in which a catalyst which is an inorganic or organic Lewis acid or Lewis base is used.

9. The process as claimed in claim 8, in which the catalyst is selected from among carboxylic acids, partly esterified carboxylic acids, unesterified and partly esterified monophosphoric, oligophosphoric and polyphosphoric acids, alkylammonium hydroxides, ammonium alkoxides, alkylammonium fluorides and amine bases.

* * * * *

UNITED STATES PATENT AND TRADEMARK OFFICE
CERTIFICATE OF CORRECTION

PATENT NO. : 6,943,265 B2
DATED : September 13, 2005
INVENTOR(S) : Oliver Shafer et al.

It is certified that error appears in the above-identified patent and that said Letters Patent is hereby corrected as shown below:

Column 7,
Line 20, delete "$R_1$" and insert therefor -- $R^1$ --.

Signed and Sealed this

Thirteenth Day of December, 2005

JON W. DUDAS
*Director of the United States Patent and Trademark Office*